2 Sheets--Sheet 1.

M. FALOON & J. D. CONNER.
Ice-Cream Freezers.

No. 157,386. Patented Dec. 1, 1874.

WITNESSES
J. P. Th. Lang.
C. L. Evert.

INVENTOR
Matthew Faloon
John D. Connor,
per
Alexander Mater
Attorneys

2 Sheets--Sheet 2.

M. FALOON & J. D. CONNER.
Ice-Cream Freezers.

No. 157,386. Patented Dec. 1, 1874.

WITNESSES

INVENTOR

Attorneys

UNITED STATES PATENT OFFICE.

MATTHEW FALOON AND JOHN D. CONNER, OF BLOOMINGTON, ILLINOIS.

IMPROVEMENT IN ICE-CREAM FREEZERS.

Specification forming part of Letters Patent No. 157,386, dated December 1, 1874; application filed July 3, 1874.

*To all whom it may concern:*

Be it known that we, MATTHEW FALOON and JOHN D. CONNER, of Bloomington, in the county of McLean and in the State of Illinois, have jointly invented certain new and useful Improvements in Ice-Cream Freezers; and do hereby declare that the following is a full, clear, and exact description thereof, reference being had to the accompanying drawings, and to the letters of reference marked thereon, making a part of this specification.

The nature of our invention consists in the construction and arrangement of an ice cream freezer, as an improvement upon the device shown in the Letters Patent granted to us May 19, 1874, No. 151,093, as hereinafter set forth.

In order to enable others skilled in the art to which our invention appertains to make and use the same, we will now proceed to describe its construction and operation, referring to the annexed drawings, in which—

Figure 1:
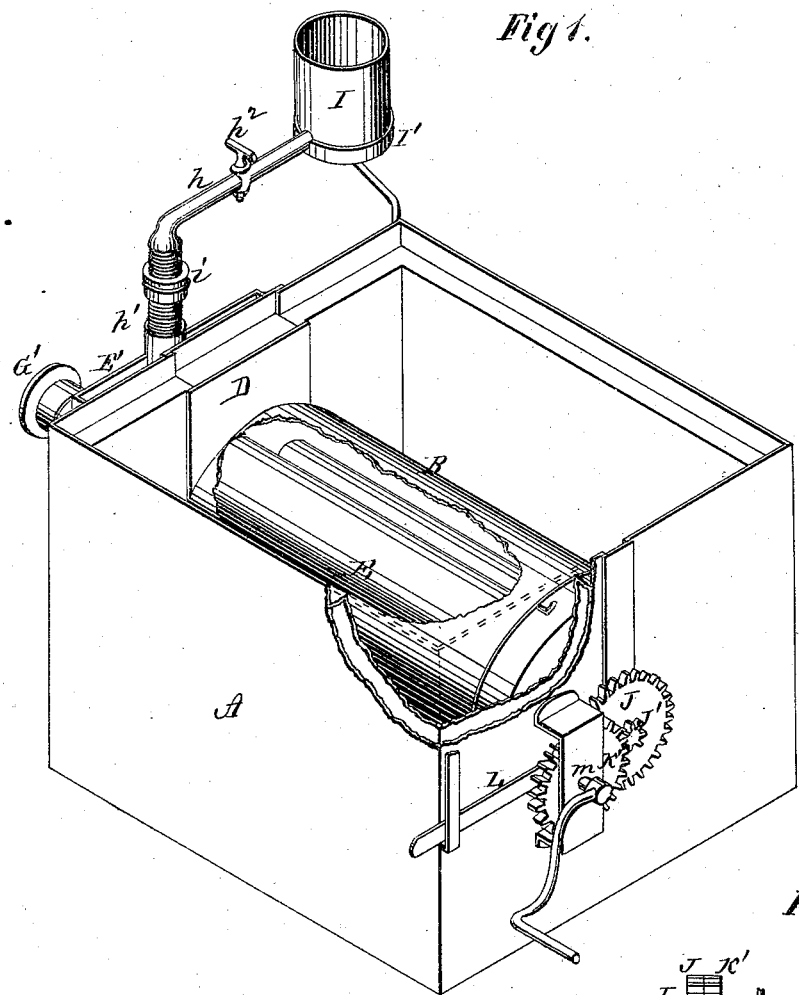
Figure 2:
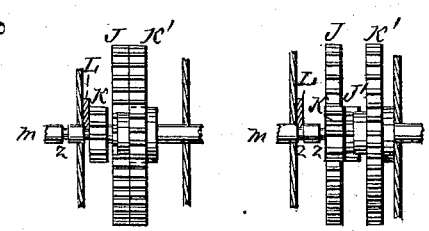
Figure 3:
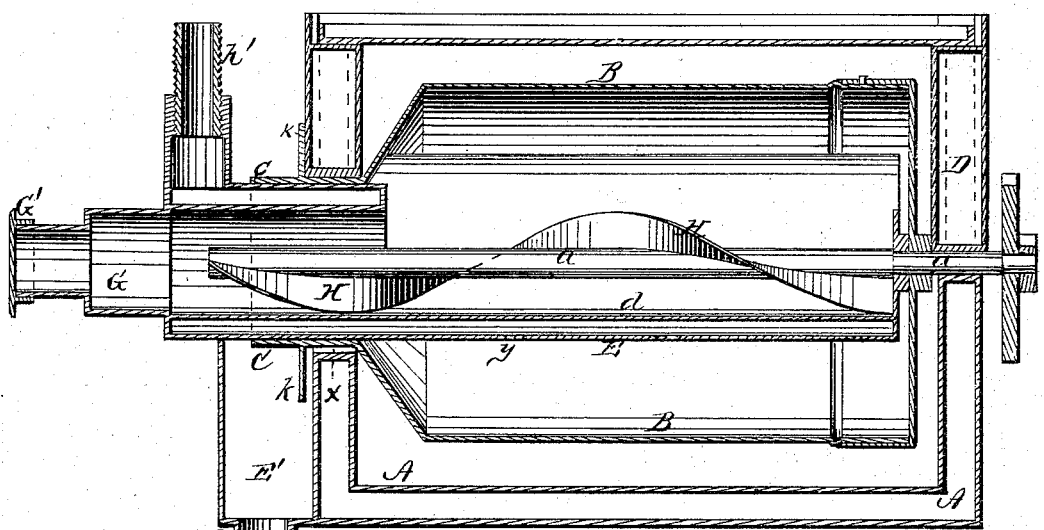
Figure 4:
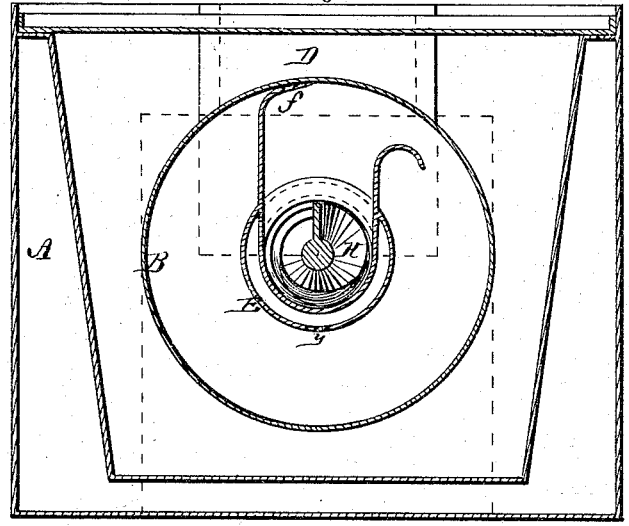

Figure 1 is a perspective of our ice-cream freezer. Fig. 2 shows the gearing for operating the freezer. Fig. 3 is a longitudinal vertical section of the freezer; and Fig. 4 is a transverse vertical section of the same.

A represents the ice-box, made in any desired form and size, with double sides and bottom, and provided with vertical slots in its ends. In this box is placed the freezing-cylinder B, one end of which is conical, and forms an enlarged hollow journal, C. Through the other end of the cylinder B passes a central shaft, a, firmly secured to it. The end of the shaft a and the hollow journal C form the bearings for the cylinder, and rest in the bottom of the slots in the ends of the cylinder, and above said bearings in these slots are placed flanged slides D to close said slots. In the bottom of the slot, under the hollow bearing C, is made a groove or channel, x, for the escape of the water from the ice-box, when it rises above this point, such water passing into a drip-cup, E', formed on or attached to this end of the ice-box, and from which drip-cup it passes out, through a tube, b, in the bottom thereof, to any vessel placed for its reception. Inside of the freezing-cylinder B, and passing through its hollow bearing C, is a double cylinder, E, so cut and opened as to form a trough, d, except that portion which fits in the bearing C, and this part is uncut. The other end of the double cylinder E hangs loosely on the shaft a. The end of the cylinder E projects beyond the hollow bearing C, and forms an outlet-nozzle, G, which is closed by means of a cap, G', except when the frozen cream is being removed from the freezer. One of the sides or wings of the cut and opened cylinder E forms a scraper, f, for the inner side of the outer cylinder B, which scraper takes the frozen cream that naturally adheres to such inner surface of the outer cylinder and scrapes it into the trough d, whence it is taken by a smaller scraper, H, within the double inner cylinder E. The scraper H is made in screw-form, and attached to the shaft a, so as to facilitate the discharge of the cream when frozen. I represents the milk-tank, supported upon a shelf, I', elevated above the ice-box, to which it is connected, as shown in Fig. 1. The milk passes from this tank, through a pipe, h, into a pipe, $h^1$, attached to the outer end of the double cylinder, and through this pipe into the space between the two shells of said double cylinder, from whence it passes through between that part of the double cylinder forming the trough d, and what forms the outer surface of the cylinder, and then escapes, through holes or openings y at the bottom thereof, into the freezing-cylinder B. The pipes h and $h^1$ are connected, by a coupling, i, as shown in Fig. 1, so as to be easily attached and detached. In the pipe $h^1$ is a stop-cock, $h^2$, for regulating the flow of milk from the tank to the freezer. Around the hollow bearing C of the cylinder B is a flange, k, which runs within the drip-cup E', and prevents any salt and water that leak through into said drip-cup from coming into the milk or cream. Any milk that may leak through between the hollow bearing C and cylinder E also goes into the drip-cup E'. Upon the projecting end of the shaft a are two cog-wheels, J and J', of different diameter; and upon a shaft, m, arranged parallel with said shaft a, are two other cog-wheels, K and K'. The shaft m is movable endwise, and provided with a crank at its end. When the shaft m is moved so that the small cog-wheel K gears with the large cog-wheel J power is obtained, and by moving the shaft m so that the large cog-wheel K' gears with the small cog-wheel J' increased speed is obtained. The shaft $m$ is held in either position by means of a notched lever, L, pivoted to the end of the ice-box, and entering circumferential grooves $z$ in the shaft, as shown in Figs. 1 and 2.

The operation of this machine is substantially as follows: The ice-box being supplied with ice and salt in the usual manner, and the tank I filled with the material for making ice-cream, the stop-cock $h^2$ is opened, allowing such material to flow into the double stationary cylinder E, and, through the openings $y$ in the bottom thereof, into the freezing-cylinder B. This cylinder, as well as the shaft $a$ and screw-scraper H attached thereto, is kept constantly revolving by means of the crank and gear-wheels. As the milk becomes frozen it naturally adheres to the inner surface of the cylinder B, and is scraped off by the scraper $f$ into the trough $d$, from whence it is conveyed by the screw-scraper H through the cylinder E, and out through the nozzle G, the cap G' having first been removed.

The milk may be introduced, if desired, through the shaft at the gear end of the cylinder into the bottom of the inner cylinder, instead of being introduced as above described.

Having thus fully described our invention, what we claim as new, and desire to secure by Letters Patent, is—

1. The drip-cup E', attached to or formed on the end of the ice-box A, and provided with the outlet $b$, substantially as and for the purposes herein set forth.

2. The combination of the drip-cup E', the slot $x$, and the drip-flange $k$, all as and for the purposes set forth.

3. The combination of the horizontal cylinder B, shaft $a$, and gears J J' with the movable shaft $m$, with grooves $z$ $z$, the gears K K', and the lever L, all substantially as and for the purposes set forth.

4. The combination of the revolving freezing-cylinder B, interior stationary cylinder E, cut open as described, forming the trough $d$ and scraper $f$, and having openings $y$ $y$, all constructed substantially as and for the purposes herein set forth.

5. The coupling $i$, in combination with the pipes $h$ $h^1$, as and for the purposes set forth.

In testimony that we claim the foregoing we have hereunto set our hands this 9th day of June, 1874.

MATTHEW FALOON.

JOHN D. CONNER.

Witnesses:
THOS. SLADE,
CHARLES B. SLADE.